(12) United States Patent
Salmento et al.

(10) Patent No.: US 7,553,111 B2
(45) Date of Patent: Jun. 30, 2009

(54) FLUIDIZING GRAVITY CONVEYOR WITH HIGH TEMPERATURE MULTI-LAYERED FLUID DISTRIBUTOR MEMBER

(75) Inventors: John S. Salmento, Nazareth, PA (US); Raymond M. Burynski, Jr., New Hartford, NY (US); James R. Schrantz, Northampton, PA (US)

(73) Assignee: FLSmidth A/S, Valby (DK)

( * ) Notice: Subject to any disclaimer, the term of this patent is extended or adjusted under 35 U.S.C. 154(b) by 153 days.

(21) Appl. No.: 11/824,172

(22) Filed: Jun. 28, 2007

(65) Prior Publication Data

US 2009/0003942 A1 Jan. 1, 2009

(51) Int. Cl.
*B65G 53/38* (2006.01)
(52) U.S. Cl. .............................. 406/90; 406/88; 406/89; 406/138
(58) Field of Classification Search .................. 406/88, 406/89, 90, 94, 138, 195
See application file for complete search history.

(56) References Cited

U.S. PATENT DOCUMENTS

| | | | | | |
|---|---|---|---|---|---|
| 1,759,983 | A | * | 5/1930 | Houston .................. | 261/122.2 |
| 2,882,097 | A | * | 4/1959 | Hamren ........................ | 406/88 |
| 3,040,439 | A | * | 6/1962 | Frost ............................ | 34/585 |
| 4,618,295 | A | * | 10/1986 | Dugge et al. ................. | 406/138 |
| 4,818,152 | A | * | 4/1989 | Lawall ......................... | 406/88 |
| 6,382,881 | B1 | * | 5/2002 | Gasquet et al. .............. | 406/197 |
| 6,764,296 | B2 | * | 7/2004 | Zahrah et al. ................ | 425/448 |
| 2003/0150806 | A1 | * | 8/2003 | Hobbs et al. | |

* cited by examiner

*Primary Examiner*—Douglas A Hess
(74) *Attorney, Agent, or Firm*—Daniel DeJoseph; Aaron M. Pile

(57) ABSTRACT

An apparatus for conveying fluidized high temperature finely divided dry material by gravity utilizes a multi-layered, gas permeable gas distributor member comprising (i) an upper layer a flat, rigid gas permeable, porous medium capable of withstanding temperatures up to about 2900° F. through which gas to fluidize the material will pass; (ii) a middle layer comprised of a gas permeable insulation material that maintains its physical integrity when exposed to temperature differentials ranging from about 500° F. to about 2900° F.; and (iii) a lower layer that supports the top and middle layers comprising a substantially flat plate having a plurality of openings therethrough through which fluidizing gas can pass.

18 Claims, 4 Drawing Sheets

FLUIDIZING GRAVITY CONVEYOR WITH HIGH TEMPERATURE MULTI-LAYERED FLUID DISTRIBUTOR MEMBER

BACKGROUND OF THE INVENTION

The present invention relates to a fluidizing gravity conveyor for conveying finely divided material in an inclined path, and, more particularly, deals with an apparatus adapted for the conveyance, by gravitational force, of such materials while at elevated temperatures and while in a state of fluidity induced by the passage of a gas, such as air, through the material. The invention further comprises a fluid distributor member having a conveying surface for use in such a conveyor, wherein the fluid distributor has substantially uniform gas-permeability and through which gas is passed from an underlying plenum chamber into the overlying finely divided material to fluidize the material so that it will flow by gravity downwardly along the gas-permeable surface. More particularly the invention comprises a fluidizing gravity conveyor for conveying finely divided material that is particularly designed for conveying high temperature material including material having temperatures ranging from about 500° F. to about 2900° F. and, most typically, material having temperatures from about 1200° F. to about 1800° F.

It is known to utilize a conveying apparatus for finely divided material such as alumina, cement raw meal, finish cement and the like, wherein a conveying conduit includes a gas permeable member dividing the conduit into an upper material chamber and a lower plenum chamber. The conduit includes an inlet at one end for supplying material to be conveyed to the material chamber and an outlet end for discharging material from the conduit. Gaseous fluid under pressure, such as air, is supplied to the lower plenum chamber for passage upwardly through the gas permeable member. Material supported on the gas permeable member in the material chamber is aerated and fluidized by the gas under pressure. When fluidized, the material will flow downwardly from the inlet to the outlet by gravity. Usually, the conveying apparatus is set at a small slope such as 6°, to facilitate material flow, although larger slopes may be utilized for a particular application. (In plant practice the slope of the conveyor is generally dictated by the headroom available.)

There is a need for a fluidized conveyor to efficiently convey finely powered material in high temperature industrial applications, for example as in conjunction with preheaters utilized in the cement manufacturing process. The use of such a conveyor can serve to lower the preheater tower height at cement plants. Typically, such preheaters consist of a plurality of serially connected cyclone separators with material being alternately entrained in the hot gases and separated by the cyclones to thereby preheat the material to as much as 1500° F. or 1600° F.

Most fluidizing gravity conveyers utilize tightly woven aeration fabric with closely controlled air porosity as the gas permeable member to distribute the fluidizing area to the material chamber. This is generally satisfactory for most applications; however typical aeration fabrics used for fluidizing gravity conveyors have a maximum temperature of 500° F. and are not suitable to evenly distribute a cold fluid from a plenum chamber to an adjacent high temperature material chamber. If high temperature materials are to be conveyed with a fabric gas permeable member the fabric may ignite and destroy the conveyor. Many commercially available porous materials otherwise suitable for use in ambient conditions can not withstand the high temperature or the thermal shock (defined as large thermal stresses caused by the large temperature differential between the material chamber and the plenum chamber as seen by the opposing sides of the distributor member). Alternatively, high temperature insulation is a porous material that can withstand the high temperature and temperature gradient, but it erodes away if it is exposed to flowing material.

U.S. Pat. No. 4,418,650 shows the use of a distributor consisting of horizontal tubes used for cooling and insulation to protect the distributor from heat. The upper surface of the distributor is not smooth since the fluidizing air passes through tubes protruding through the surface of the distributor. U.S. Pat. No. 4,818,152 teaches a fluidizing gravity conveyor having utility for hot particulate material which includes a heat resistant plate having a plurality of holes for receiving bubble caps or nozzles that protrude above the upper surface of the plate to disperse air flow from a lower plenum chamber to the upper material chamber. The conveyors taught by such patents may not be optimum for certain types of material since the protruding tubes, bubble caps or nozzles may cause such material to clump and form obstructions to the material flow. Therefore, it would be advantageous, and it is an object of this invention, to have a conveyor suitable for high temperature applications that has a smooth upper surface for receiving and conveying material.

SUMMARY OF THE INVENTION

In general, the foregoing and other objects will be carried out by utilizing an apparatus for conveying finely divided dry material comprising an enclosed conduit having an inlet at one end for material to be conveyed and an outlet at its other end; means mounted in said conduit dividing the conduit into an upper material chamber and a lower plenum chamber for supporting material to be conveyed in the material chamber; said lower plenum chamber adapted to be connected to a source of gaseous fluid under pressure. The means mounted in said conduit to divide the conduit into an upper material chamber and a lower plenum chamber plate comprises a multi-layered member having a substantially smooth upper surface, said member serving as a fluid distributor to evenly distribute a colder gaseous fluid from the lower plenum chamber to the upper hotter material chamber. In the multi-layered member each layer is made from common materials and performs a specific function that allows the distributor to operate at a higher temperature than is possible than if it has a single layer. The multi-layered member is further allowed room for thermal expansion and has seals along its edges.

The distributor member has a smooth upper heat resistant layer that supports the material being conveyed, and preferably has three layers. The upper layer that serves as the upper surface supporting the material is a substantially smooth, gas permeable, substantially incompressible, porous medium capable of withstanding the high temperature in the material chamber, and which further provides many small holes through which fluidizing gas will pass for the hot material. The upper layer protects the under layers of the distributor from the flowing, hot material, and is of a material that will not react with or erode away when exposed to the high temperature material being conveyed in a given application. For example, in cement application the material will not be adversely affected by high temperature lime and alkalis, among other materials. The middle layer is a porous, gas permeable high temperature insulation that reduces the temperature gradient across the upper layer and protects the lower layer from the high temperature present in the upper material chamber. The lower layer is a perforated (or porous) support material that supports the upper layers and provides the pressure drop used to evenly distribute the conveying air to the upper layers. Each layer performs specific functions that allow the multi-layered fluid distributor, that typically is made from common materials, to operate at a higher temperature differential then a distributor made from a single component. In one embodiment, a three layer distributor is used in a fluidizing gravity conveyor to convey hot powdered material at temperatures greater than 1200° F. up to about 2900° F., and most typically up to about 1800° F.

BRIEF DESCRIPTION OF THE DRAWINGS

The invention will be described in connection with the annexed drawings wherein:

FIG. 4 depicts a cross-sectional view of the hot fluidizing gravity conveyor of the present invention taken, with reference to the view depicted in FIG. 2, in the direction of arrows C-C in a cut from line 51 to line 51a.

Similar numerals are utilized in the drawings to designate similar components. The figures are not necessarily drawn to scale.

DETAILED DESCRIPTION OF THE INVENTION

Figure 1:
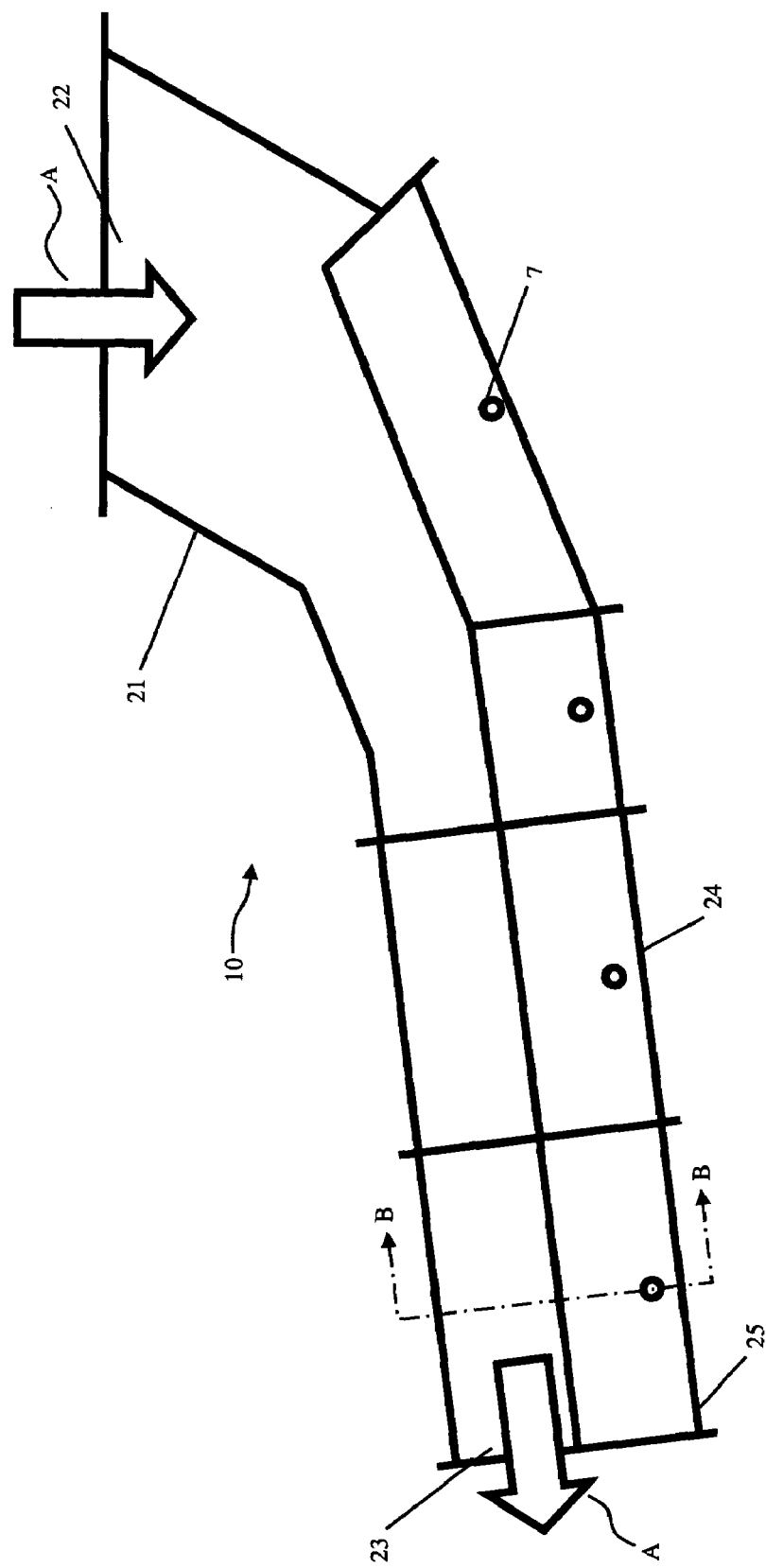
FIG. 1 is an external side view of a hot fluidizing gravity conveyor of the present invention.

FIG. 1 depicts an external side view of a fluidizing gravity conveyer according to the present invention that comprises a conduit generally indicated at 10 for conveying hot, finely divided dry material such as preheated cement raw meal. As used herein, the term "hot material" will mean material in excess of 500° F. and in particular material in excess of 1200° F. Conduit 10 has material inlet 22 and material outlet 23 from which material is transferred to another apparatus in the industrial process such as a storage bin or another conveying device. The direction of material flow into and out of the conveyor is depicted by arrows A. Also depicted is separate material inlet section 21, the length of which is exaggerated in comparison to the depicted overall length of conduit 10. Conduit 10 is preferably assembled as a series of attached sections, with substantially identical attached conveying sections 24 and 25 depicted. In practice, and of course depending upon the specific application, more than two conveying sections can be employed in the construction of a specific conduit. Fluidizing air enters the conduit at air intake 7.

Figure 2:
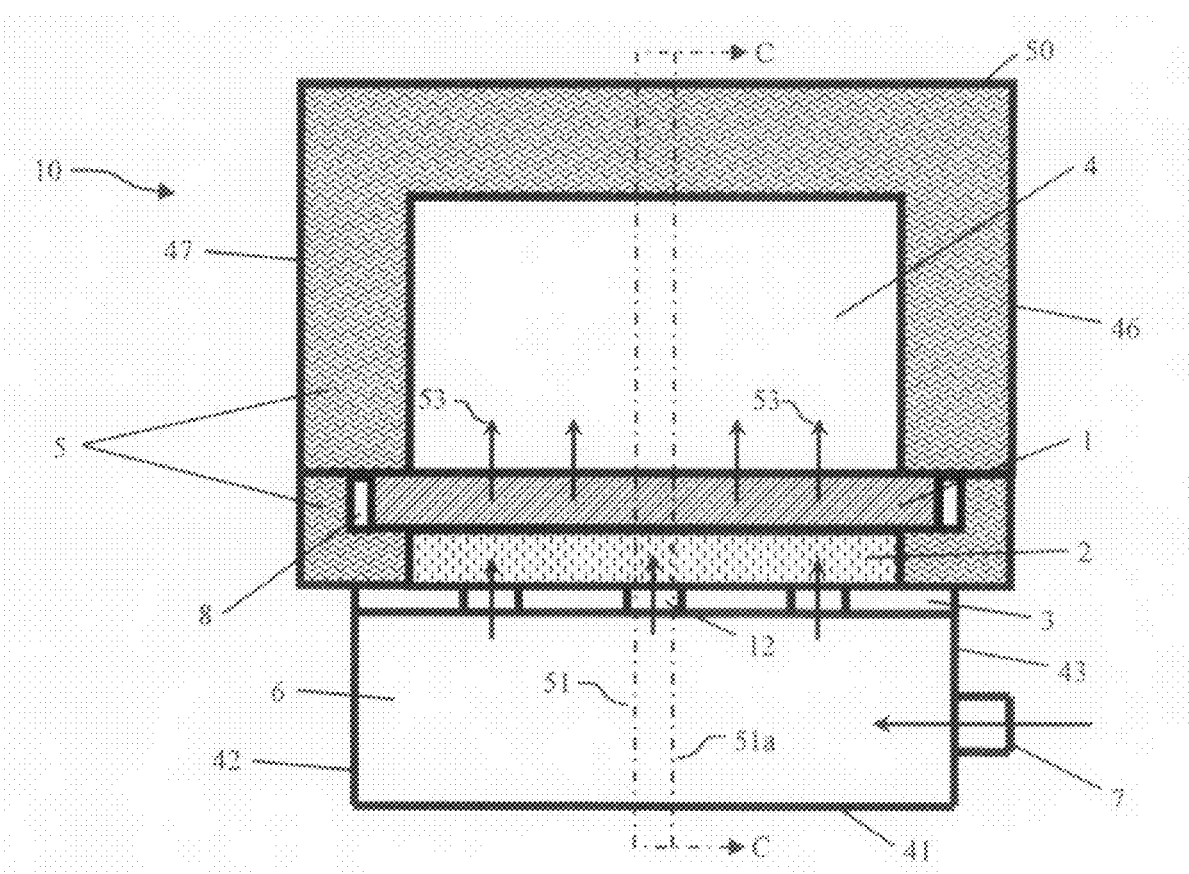
FIG. 2 depicts a cross-sectional view of a hot fluidizing gravity conveyor of the present invention including a multi-layered fluid distributor member in the direction of arrows B-B to the view depicted in FIG. 1.

Referring to FIG. 2, conduit 10 is enclosed by a bottom 41, lower sidewalls 42 and 43 which in combination with end walls (not depicted) define lower plenum chamber 6 and upper sidewalls 46 and 47 and a top 50 which in combination with upper end walls (not depicted) defines material chamber 4.

The conduit 10 includes a multilayer gas permeable gaseous distributor member 11 through which air passes from lower plenum chamber 6 to material chamber 4 in the directions of arrows 53. Distributor member 11 supports a bed of material and divides the conduit into lower plenum chamber 6 and upper material chamber 4. The lower plenum chamber 6 is adapted to be connected through line 7 along the side of the conveyor to a source of gaseous fluid under pressure such as a blower (not shown). The gas supply may be provided at any number of points along the length of the conduit.

Figure 3:
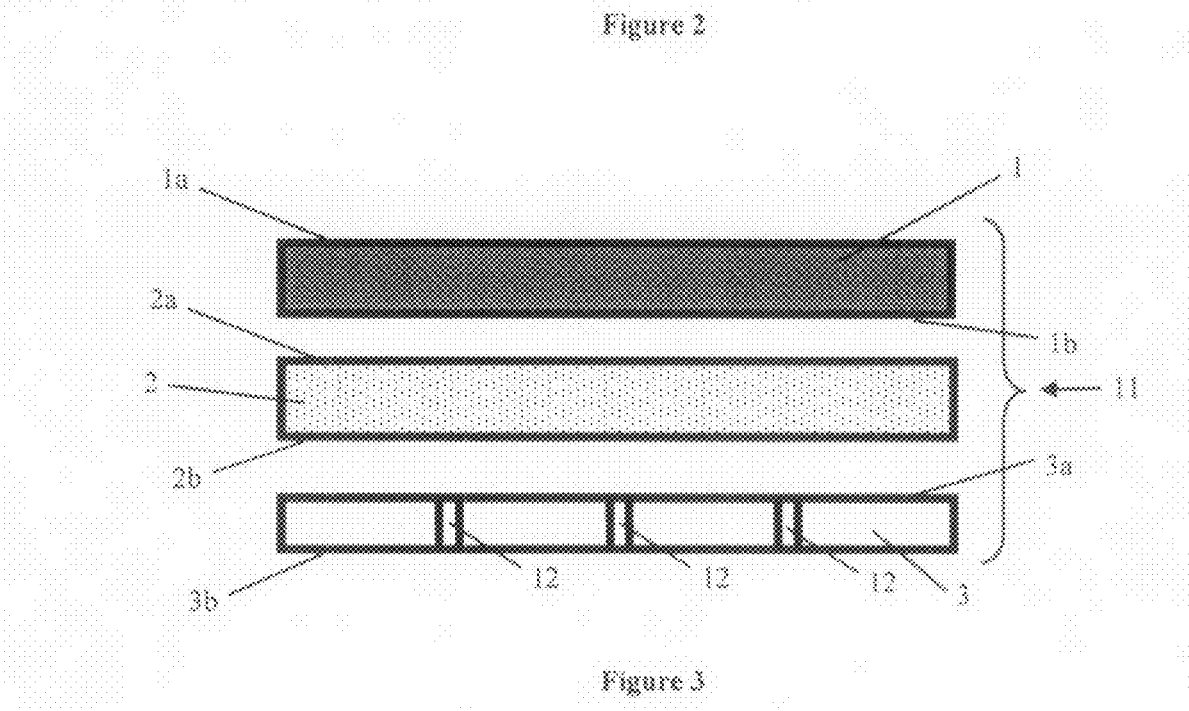
FIG. 3 depicts a cross-sectional, exploded view of a multi-layered fluid distributor member of the present invention.

As shown in detail in FIG. 3, gas permeable member 11 is a multi-layer structure preferably consisting of three layers: upper layer 1 having upper side 1a and lower side 1b, middle insulation layer 2 having upper side 2a and lower side 2b, and lower support layer 3 having upper side 3a and lower side 3b. Member 11 should be sufficiently gas permeable to assure that the pressure drop across it is sufficient to permit an even distribution of fluidizing gas at a flow rate of the gas through distributor member 11 necessary to fluidize the material to achieve desired capacity at the given angle of inclination.

Upper layer 1, which is adjacent to the material chamber 4, comprises a substantially smooth medium that is substantially incompressible, porous and gas permeable and is capable of withstanding temperatures greater than about 500° F., preferably greater than about 1200° F. up to typically about 1800° F., although (depending on the specific material selected and the budget of the practitioner) it is possible for upper layer 1 to be designed to be capable of withstanding temperatures up to about 2900° F. by utilizing specialty ceramic materials. Upper layer 1 is capable of allowing a suitable flow of gas therethrough to fluidize the material in the material chamber. The medium used to form upper layer 1 will contain many small holes (which, depending upon the particular medium, may be too small to see with the naked eye) essentially throughout and across its entire surface through which fluidizing gas will pass. The upper surface of the medium is preferably, although not necessarily, substantially flat. Examples of suitable materials for upper layer 1 are porous high-temperature ceramic materials, including ceramic plates, tiles, porous stones, porous brick, or filter stones, which can be made from materials that include alumina, silicon carbide, alumina silicates, mullite or silicon nitride. A non-inclusive list of commercially available materials suitable for use in upper layer 1 includes Fairey Industrial Ceramics industrial porous ceramic materials, Filtros® ELECTROFLO® resin bonded silica, Filtros FILTROS® glass bonded silica, Filtros Kellundite® ceramically bonded alumina, Refractron Technologies AF Series aluminum oxide porous ceramics, Refractron Technologies SF Series silicon carbide porous ceramics, and Saint Gobain Ceramics Alundum porous media.

Middle layer 2 which is adjacent to upper layer 1, serves to protect upper layer 1 from having its lower side 1b exposed to the temperature extremes created by exposure to the ambient air in plenum chamber 6. Middle layer 2 is a gas-permeable, porous high temperature insulation layer. The layer has to be able to maintain its physical integrity when exposed to a temperature differential between its upper side 2a (that is, the side adjacent to lower side 1b of upper layer 1) and its lower side 2b (that is, the side adjacent to the upper side 3a of bottom layer 3) ranges from about 500° F. to preferably about 1800° F. and optionally up to about 2900° F. Suitable components for the middle layer 2 includes alumina fiber blankets, amorphous silica blankets, bulk fiber insulation, calcium silica fiber blankets, ceramic foams, fiberglass blankets, ceramic fiber blankets, or needled insulation. A non-inclusive list of commercially available materials suitable for use in upper layer 2 includes AMETEK SILTEMP® fiberglass heat-resistant fabric, AMETEK ULTISIL® silica textile, EMPIRE Refractory Inswool® ceramic fiber blanket, HITCO CARBON COMPOSITES REFRASIL® high temperature textile, Hi-Por® porous alumina and hydroxyapatite (HA) materials, Hi-Por® porous ceramic foam, NUTEC FIBRATEC® ceramic fiber products, SAFFIL polycrystalline alumina fiber blanket, SAFFIL MAT, UNIFRAX Fiberfrax® refractory ceramic fiber high temperature insulation products, UNIFRAX Insulfrax® refractory ceramic fiber high temperature insulation products, UNIFRAX Isofrax® silica-magnesia fiber, VESUVIUS ALUCEL® ceramic foam fiber, and VESUVIUS NEW WAVE® ceramic foam fiber.

Lower support layer 3 comprises a substantially flat plate that is capable of supporting the upper two layers when the conveyor is not in operation. Lower support layer 3 will not be exposed to the same high temperature requirements as upper layer 1, and therefore can be comprised of a wide range of materials, including ceramics, stainless steel, high strength polymers such as polycarbonates, polyacrylates, polyurethanes, an aeration fabric, wire mesh, sintered wire mesh and porous mesh. Lower support layer 3 will have a plurality of openings 12 therethrough in both its length and width directions or it can be a porous material having many small pores. Gas will flow through lower support layer 3 and will continue through gas permeable layers 2 and 1 and finally into material chamber 4.

The multi-layered design of the fluid distributor member when utilized in conjunction with a fluidized gravity conveyor of the present invention is advantageous in that (a) its substantially smooth upper surface allows greater capacity in the conveyor, compared to other designs of high temperature conveyors of similar sizes used at similar slopes, which means that the flowing material in the conveyor of the present invention has a greater velocity and momentum; (b) less aeration gas is needed since the gas passes up through many fine holes across the entire surface of the upper layer instead of fewer, larger holes and there is an accompanying reduction in zones or areas that don't fluidize; (c) the conveyor is less likely to become blocked with material chunks and foreign objects since the surface is smooth and there is a greater momentum of flowing material.

In order to convey the hot material, it is necessary to properly insulate the conveyor with a heat resistant material. For this purpose suitable refractory material indicated at 5 should be used. Refractory material 5 also serves to define the side walls 46 and 47, top 50 and end walls of the upper material chamber 4. The refractory material can optionally extend down to encase a portion of the gas permeable member 11. If desired the refractory material can be covered, on the outside of the conveyor, with another layer such as a metal skin. Suitable insulating refractory serves to maintain the temperature on the outside of the conveyer at less than 400° F. while conveying material having a temperature as high as 1800° F. Alternatively, a non-porous ceramic or a metal capable of withstanding such high temperatures may be utilized.

Figure 4:
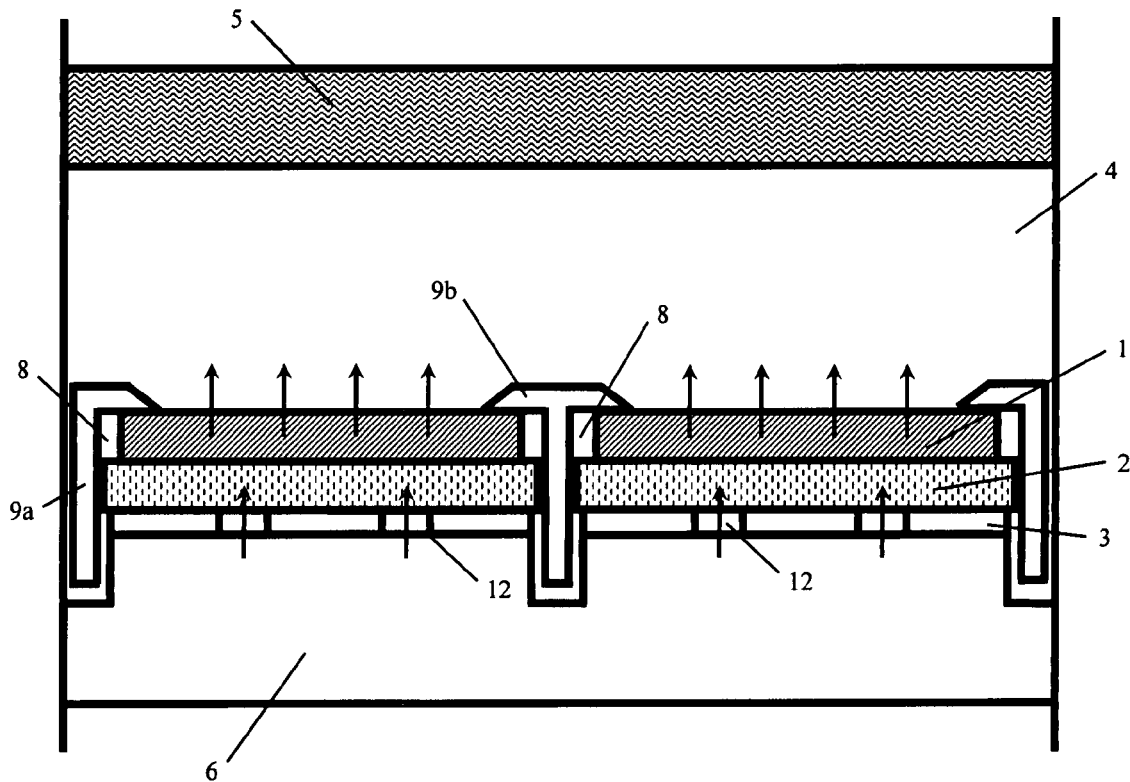
Figure 5:
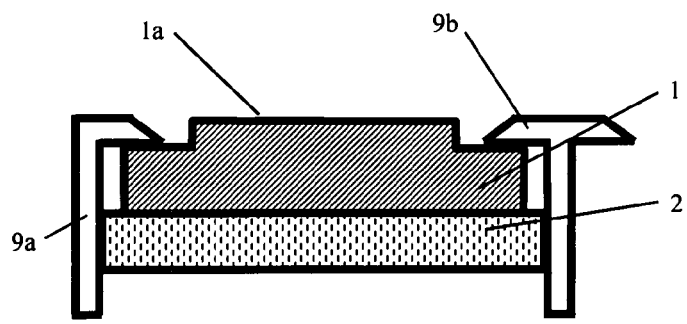
FIG. 5 depicts another embodiment of the hot fluidizing gravity conveyor of the present as depicted in FIG. 4.

The upper layer 1 is dimensioned to allow it to expand relative to the conveyor so that when high temperature material is being conveyed any differential thermal expansion between layer 1 and the conveyor walls will not affect the structure of the conveyor. In the depicted embodiment an optional gap or space 8 is provided at the end of a given section of upper layer 1 to allow for its expansion. FIG. 4 further depicts optional end seals 9a located at the end of a conduit section and optional mid seal 9b located at a point that is approximately the middle of the conduit section, so that the distances from said point to the immediately preceding and succeeding conduit sections is approximately equal. Both seals are positioned adjacent to gap 8, which together provide a seal for gas and allow for thermal expansion and manufacturing tolerances of upper layer 1. Although seals 9a and 9b are depicted as having top surfaces above the plane of upper side 1a, it should be noted that the drawings are not to scale and seals 9a and 9b actually account for a very small percent of the total area of upper side 1a and do not therefore significantly affect the advantages inherent in having a smooth upper surface 1a. FIG. 5, however, depicts an alternative design in which seals 9a and 9b are off-set so as to have their upper surfaces coplanar with upper surface 1a of upper layer 1.

In operation, it is normal to supply ambient air to the plenum chamber 6 which ambient air will maintain the lower supporting layer 3 at a relatively cool temperature. The air under pressure flows upwardly through the openings in lower layer 3, through the gas permeable insulation layer 2 and through gas permeable upper layer 1 to aerate and fluidize the material in the material chamber 4. The thus aerated material will then flow downwardly through the conveyor by gravity. When the gas flow through gas permeable member 11 stops, the material will tend to deaerate and settle back down on the upper layer 1. The rate at which the material is conveyed can be regulated by the flow rate of the gas through gas permeable member 11 and the incline of the conduit.

Figure 6:
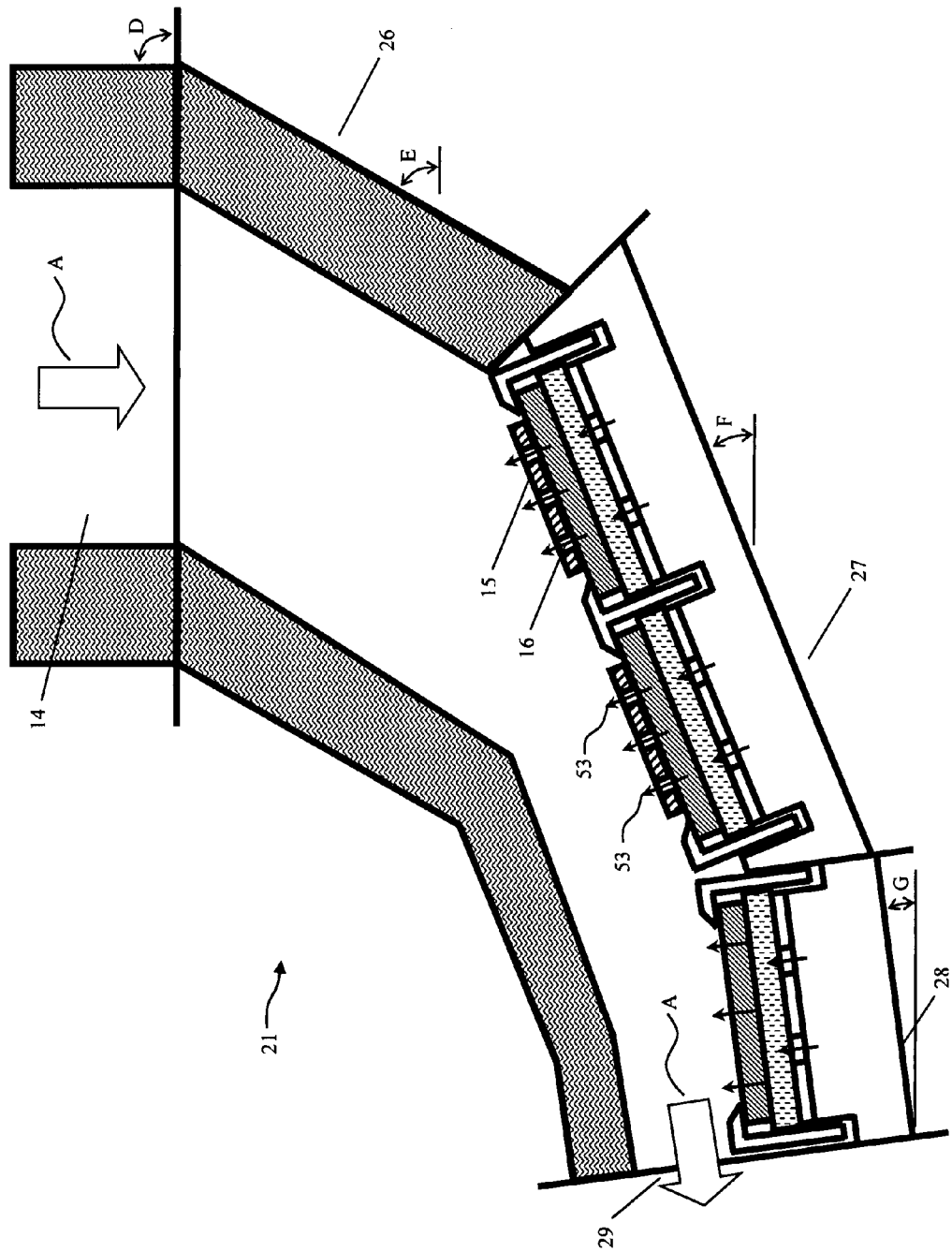
FIG. 6 is a cross-sectional side view of an optional mitered inlet portion of a hot fluidizing gravity conveyor of the present invention that incorporates, in part, the present invention's multi-layered fluid distributor.

FIG. 6 illustrates another embodiment of this application in which a mitered material inlet portion, generally designated as 21, for the fluidized gravity conveyor is employed. Material is supplied to inlet 21 by gravity from outlet 14 of the immediately upstream apparatus. Typical fluidized air conveyors have an abrupt bend at the inlet section whereby material is transitioned from an almost straight vertical fall to thereafter be conveyed at a predetermined slope for the conveyor ranging from about 0° to about 60°, and for typical industrial applications, from about 5° to about 12° throughout the length of the conveyor. It has been found advantageous in high temperature gravity conveyors and depending on the properties of the material being conveyed to replace the abrupt bend at the inlet end with a series of short (each ranging from about 1 feet to about 4 feet in length, with the sections not necessarily being the same length), straight conveying sections, with three such sections 26, 27 and 28 being depicted in FIG. 6. Each of the sections 26, 27 and 28 serves to gradually turn the material (to the extent represented by, respectively, angles, E, F and G), from the slope at which the material enters the inlet (as represented by angle D), toward the desired slope at which the material will be conveyed through conduit 10, rather than abruptly turn the material from, for example, an approximately 90° slope at which the material enters the conveyor to, for example, a 6° slope at which it will be transported through the conveyor. The section or sections closest to end 29 of the material inlet will employ the multi-layered fluid distributor member of the invention, while the section closest to the material may optionally and alternatively be comprised of refractory. The main advantages of utilizing such a mitered inlet in such applications is that it conserves the momentum of the falling material thus reducing the possibility of chunks breaking the upper layer and further minimizes the chance of blockages. FIG. 6 also displays the optional embodiment of using impact plates 15 on some sections in inlet 21. These plates are attached to upper layer 1 and are of a high temperature, high strength material such as steel and also serve to reduce the likelihood of there being impact breaks in upper layer 1. The impact plates each have a plurality of spaced apart openings 16 therethrough through which fluidizing air passes into material chamber 4.

As used herein, the term "permeable" or "gas permeable" represents the capacity of a porous medium to pass air under a given set of conditions. It will be understood that the "permeability" of a material is not synonymous with nor directly related to the "porosity" of the material. "Porosity" is defined as the percent ratio of pore space, by volume, to the bulk volume of the material. Thus, media having identical "porosities" may have widely differing "permeabilities" due to variations in the diameter and number of pores. In the employment of suitable porous media for use in the method of the invention, it is important that a uniform distribution of the air passages through the medium be achieved in order that the introduction of air into the conveyed material will be as uniform as possible. The gas used under normal circumstances is air, although in certain special cases it may be desirable to employ an inert gas, a heated or refrigerated gas or a mixture of gases, or a gas chemically reactive with respect to the material being conveyed. The use of such gases is within the scope of the term "aeration." which as used herein refers to the introduction of gas into and through the material in volume sufficient to expand the body of material, without mechanically entraining the particles and removing them from the expanded body of material. Such mechanical entrainment, which in reality is a form of pneumatic conveying, is avoided in fluidized gravity conveyors since it wastes power and decreases the efficiency of the conveyor. It is frequently not necessary to effect complete aeration of the entire bed of material, but only the portion directly above the porous medium.

One skilled in the art understands that the term "substantially incompressible" means material that does not deform under the normal loads it is exposed to in a given application.

From the foregoing it should be apparent that the objects of the present invention have been carried out. It is intended that the foregoing be a description of a preferred embodiment and that the invention be limited solely by that which is within the scope of the appended claims.

What is claimed is:

1. An apparatus for conveying high temperature finely divided dry material comprising
   (a) an enclosed conduit having an inlet at one end for material to be conveyed and an outlet at its other end; and
   (b) a multi-layered, gas permeable member that serves as a gas distributor mounted in said conduit dividing the conduit into an upper material chamber and a lower plenum chamber, said lower plenum chamber adapted to be connected to a source of gas under pressure; said member permitting the passage of said gas from the lower plenum chamber into the upper material chamber to aerate and fluidize material in the upper material chamber whereby the thus fluidized material will flow downwardly above said upper gas distributor member at a predetermined slope from said inlet to said outlet by gravity; said multi-layered, gas permeable member comprising (i) an upper layer having a substantially smooth top side adjacent to the upper material chamber and comprising a gas permeable, porous medium capable of withstanding temperatures up to about 2900° F.; (ii) a middle layer having a top side adjacent to the upper layer and a bottom side, said middle layer comprised of a gas permeable insulation material that maintains its physical integrity when exposed to temperature differentials up to about 2900° F. between its upper side and its bottom side; and (iii) a lower layer adjacent to the bottom side of the middle layer for supporting the top and middle layers, said lower layer comprising a substantially flat plate having a plurality of openings therethrough through which fluidizing gas can pass.

2. Apparatus for conveying material according to claim 1 wherein the slope ranges from about 0° to about 60°.

3. Apparatus for conveying material according to claim 2 wherein the slope ranges from about 5° to about 12°.

4. Apparatus for conveying material according to claim 1 wherein the top side of the upper layer is substantially flat.

5. Apparatus for conveying material according to claim 1 wherein the upper layer is capable of withstanding temperatures up to about 1800° F. and the middle layer is comprised of an insulation material that maintains its physical integrity when exposed to temperature differentials up to about 1800° F.

6. Apparatus for conveying material according to claim 1 wherein the upper layer is a ceramic material.

7. Apparatus for conveying material according to claim 1 wherein the middle layer is comprised of a material selected from alumina fiber blankets, amorphous silica blankets, bulk fiber insulation, calcium silica fiber blankets, ceramic foams, fiberglass blankets, ceramic fiber blankets, or needled insulation.

8. Apparatus for conveying material according to claim 1 wherein the lower support layer is comprised of a material selected from a ceramic, stainless steel, a high strength polymer, an aeration fabric, wire mesh, sintered wire mesh and porous mesh.

9. Apparatus for conveying finely divided dry material according to claim 1 further comprising means to permit thermal expansion of said upper layer relative to said conduit.

10. Apparatus for conveying finely divided dry material according to claim 1 wherein the upper material chamber has side walls, end walls and a top formed from a heat resistant material.

11. Apparatus for conveying finely divided dry material according to claim 1 wherein steel impact plates are attached to the top side of the upper layer at the material inlet of the conduit, said impact plates having a plurality of spaced apart openings therethrough through which fluidizing air passes into the material chamber.

12. Apparatus for conveying finely divided dry material according to claim 1 wherein the material inlet is comprised of a series of straight sections, with at least some of said sections comprising a multi-layered fluid distributor member and an associated lower plenum chamber, with said sections being placed at angles relative to each other to gradually turn the material entering the inlet from a substantially vertical direction to the predetermined slope of the conduit.

13. A multi-layered air distributor for distributing ambient air into a chamber containing high temperature finely divided dry material at a flow rate capable of fluidizing material within said chamber, said distributor comprising (i) an upper layer having a substantially smooth top side and comprising an air permeable, porous medium capable of withstanding temperatures up to about 2900°; (ii) a middle layer having a top side adjacent to the upper layer and a bottom side, said middle layer comprised of an air permeable insulation material that maintains its physical integrity when exposed to temperature differentials up to about 2900° F. between its upper side and its bottom side; and (iii) a lower layer adjacent to the bottom side of the middle layer for supporting the top and middle layers, said lower layer comprising a substantially flat plate having a plurality of openings therethrough through which said ambient air can pass.

14. A multi-layered air distributor according to claim 13 wherein the upper layer is capable of withstanding temperatures up to about 1800° F. and the middle layer is comprised of an insulation material that maintains its physical integrity when exposed to temperature differentials up to about 1800° F.

15. A multi-layered air distributor according to claim 13 wherein the upper layer is a ceramic material.

16. A multi-layered air distributor according to claim 13 wherein the top side of the upper layer is substantially flat.

17. A multi-layered air distributor according to claim 13 wherein the middle layer is comprised of a material selected from alumina fiber blankets, amorphous silica blankets, bulk fiber insulation, calcium silica fiber blankets, ceramic foams, fiberglass blankets, ceramic fiber blankets, or needled insulation.

18. A multi-layered air distributor according to claim 13 wherein the lower support layer is comprised of a material selected from a ceramic, stainless steel, a high strength polymer, an aeration fabric, wire mesh, sintered wire mesh and porous mesh.

* * * * *